May 21, 1929.  E. PACY  1,714,187
TAKING UP WEAR IN STRUCTURAL MEMBERS
Filed Jan. 13, 1928
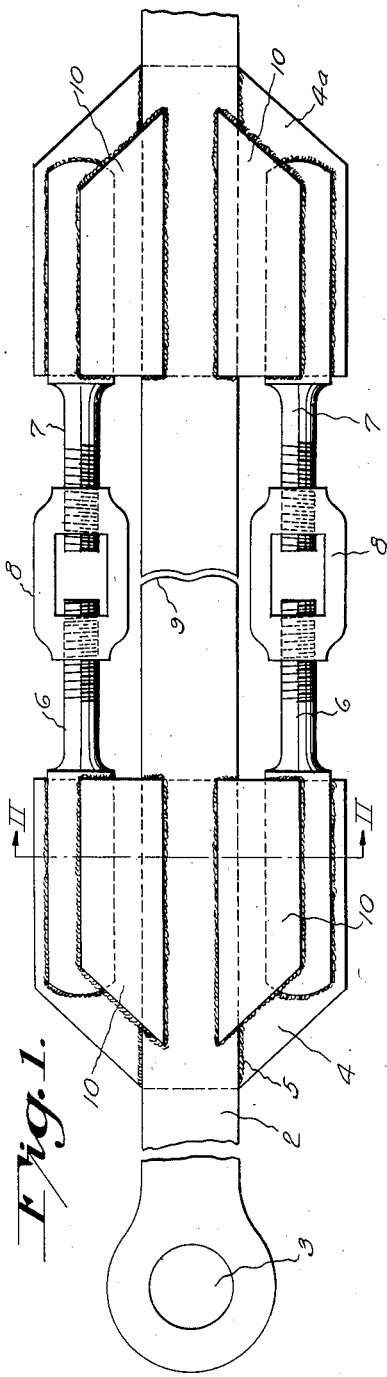
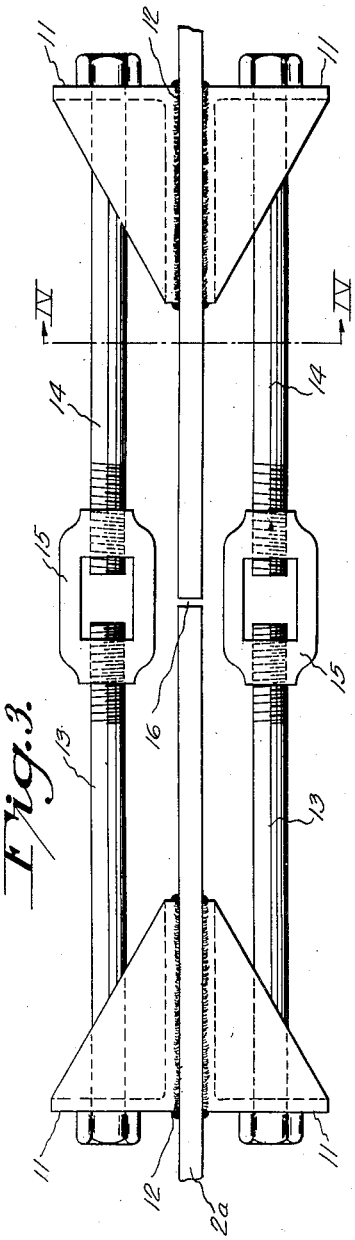
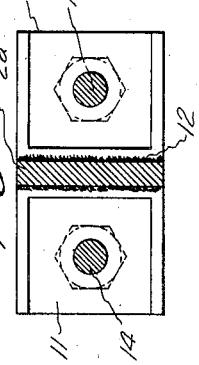
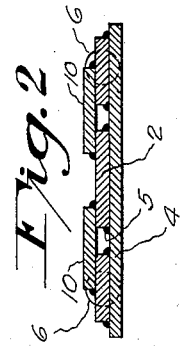
INVENTOR
Ernest Pacy

Patented May 21, 1929.

1,714,187

UNITED STATES PATENT OFFICE.

ERNEST PACY, OF PITTSBURGH, PENNSYLVANIA.

TAKING UP WEAR IN STRUCTURAL MEMBERS.

Application filed January 13, 1928. Serial No. 246,505.

This invention relates to the taking up of wear in structural members and is particularly useful for taking up slack in the link members of bridges, although it has numerous other applications.

Bridges employing links having eyes at the ends, which eyes are engaged by pins, become loose and rattle after a period of time, due to wear of the eyes of the links or on the pins passing through these eyes. The life of the structure can be materially lengthened if this wear can be taken up.

I provide for connecting a screw thread device to the member at spaced points, tightening the screw thread members so as to test the connections and then severing the structural member between the connections. Preferably the screw thread device is connected to the member by welding. After the screw thread member has been tightened so as to test the connections, the member may be severed, as by a cutting torch, and tightened.

In the accompanying drawing illustrating the present preferred embodiment of my invention and one modification thereof, Figure 1 is a side elevation of a take-up connection, Figure 2 is a transverse section taken on the line II—II of Figure 1, Figure 3 is a view corresponding to Figure 1, but showing a modified construction, and Figure 4 is a view taken on the line IV—IV of Figure 3.

Figure 1 shows a structural member 2, one of whose ends, comprising an eye 3, is illustrated. When it is desired to take up wear at the eyes 3, or to compensate for stretching of the structural member, spaced plates 4 and 4ª are welded thereto, as indicated at 5. Screw thread devices each comprising a right-handed screw thread member 6, a left handed screw thread member 7 and a turn-buckle 8 are then welded to the plates 4 and 4ª. The turn-buckles 8 are then tightened so as to put the screw thread members under strain, thus testing the welded connections. The structural member 2 is then severed, as by a cutting torch, as indicated at 9. The entire load is then carried by the connections.

Preferably before the structural member 2 is severed at 9, reinforcing plates 10 are applied. These plates are welded to the structural members and also to the screw thread devices, so as to increase the strength of the joints and thus provide additional security.

Figures 3 and 4 show a modified structure. The arrangement shown in Figures 1 and 2 is particularly useful since the device lies very close to the plane of the structural member, and structural members lying side by side may all be tightened up. The form shown in Figures 3 and 4 may be applied to single structural members, but takes up more room. It comprises brackets 11 which are welded to the structural member 2ª as indicated at 12. Bolts 13 and 14, which are threaded respectively right-handed and left-handed, pass through openings in the brackets 11 and are engaged by turn-buckles 15. After the turn-buckles have been tightened up so as to test the welds, the structural member is severed as at 16.

The arrangement shown provides a convenient and very satisfactory means of taking up slack in structural members whereby the life of the structure may be materially lengthened. I have illustrated the present preferred embodiment of my invention and one modification thereof, but it is not limited to these forms, as it may be otherwise embodied or practiced within the scope of the following claims.

I claim:—

1. The method of taking up slack in structural members, which includes connecting a screw thread device to the member at spaced points, tightening the screw thread device so as to test its connections, and then severing the structural member between the connections.

2. The method of taking up slack in structural members which includes welding a screw thread device to the member at spaced points, tightening the screw thread device so as to test the welds, and then severing the structural member between the connections.

3. The method of taking up slack in structural members which includes welding a screw thread device to the member at spaced points, tightening the screw thread device so as to test the welds, severing the structural members, and welding a reinforcing member over the connections so as to additionally secure the same.

4. The method of taking up slack in structural members which includes welding a screw thread device to the member at spaced points, tightening the screw thread device so as to test the welds, severing the structural member, welding a reinforcing member over the connections so as to additionally secure the same, and reinforcing the connections by additional welding.

5. The method of taking up slack in structural members which includes connecting screw thread devices to the member on opposite sides thereof and at spaced points, severing the structural member between the connections, and adjusting the screw thread members.

6. The method of taking up slack in structural members which includes connecting a screw thread device to the member at spaced points, severing the structural member between the connections, and adjusting the screw thread device.

7. The method of taking up slack in structural members which includes welding a screw thread device to the member at spaced points, severing the structural member between the connections, and then adjusting the screw thread member.

In testimony whereof I have hereunto set my hand.

ERNEST PACY.